United States Patent
Wu (10) Patent No.: US 12,156,219 B2
(45) Date of Patent: Nov. 26, 2024

(54) UPLINK TRANSMISSION PROCESSING METHOD, INFORMATION CONFIGURATION METHOD, AND RELATED DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 354 days.

(21) Appl. No.: 17/562,901

(22) Filed: Dec. 27, 2021

(65) Prior Publication Data

US 2022/0124704 A1    Apr. 21, 2022

Related U.S. Application Data

(63) Continuation of application No. PCT/CN2020/097991, filed on Jun. 24, 2020.

(30) Foreign Application Priority Data

Jul. 4, 2019 (CN) ......................... 201910601040.4

(51) Int. Cl.
  *H04W 72/21* (2023.01)
  *H04L 27/26* (2006.01)
  *H04W 72/044* (2023.01)

(52) U.S. Cl.
  CPC ....... *H04W 72/21* (2023.01); *H04L 27/26025* (2021.01); *H04W 72/044* (2013.01)

(58) Field of Classification Search
  None
  See application file for complete search history.

(56) References Cited

U.S. PATENT DOCUMENTS

| | | | |
|---|---|---|---|
| 10,855,508 B2 | 12/2020 | Li et al. | |
| 2011/0242969 A1 | 10/2011 | Dayal et al. | |
| 2017/0265167 A1* | 9/2017 | Guo | H04W 72/30 |
| 2019/0173656 A1 | 6/2019 | Takeda et al. | |
| 2019/0335472 A1 | 10/2019 | Wu et al. | |
| 2020/0154442 A1 | 5/2020 | Zhou | |
| 2020/0236611 A1 | 7/2020 | Hong | |

(Continued)

FOREIGN PATENT DOCUMENTS

| | | |
|---|---|---|
| CN | 102469465 A | 5/2012 |
| CN | 102546074 A | 7/2012 |

(Continued)

OTHER PUBLICATIONS

VIVO, UL inter-UE Tx prioritization for URLLC, 3GPP TSG RAN WG1 #97, May 13-17, 2019, R1-1906150, Reno, USA.

(Continued)

*Primary Examiner* — Anh Ngoc M Nguyen (74) *Attorney, Agent, or Firm* — IP & T GROUP LLP (57) ABSTRACT

An uplink transmission processing method includes: obtaining configuration information, where the configuration information is used to indicate uplink transmission stop information in a first absolute time period, or the configuration information is configuration information for stopping uplink transmission on a first resource; and stopping uplink transmission based on the obtained configuration information.

20 Claims, 5 Drawing Sheets

(56) References Cited

U.S. PATENT DOCUMENTS

2020/0374905 A1* 11/2020 Lin .................. H04W 72/1268
2021/0112592 A1* 4/2021 Lee .................... H04W 74/006

FOREIGN PATENT DOCUMENTS

| CN | 103929811 A | 7/2014 |
| CN | 106559365 A | 4/2017 |
| CN | 107734520 A | 2/2018 |
| CN | 109565804 A | 4/2019 |
| WO | 2016091008 A1 | 6/2016 |
| WO | 2017219825 A1 | 12/2017 |
| WO | 2019/006737 A1 | 1/2019 |
| WO | 2019/062627 A1 | 4/2019 |
| WO | 2019/071480 A1 | 4/2019 |

OTHER PUBLICATIONS

Extended European Search Report for European Patent Application No. 20834227.9 issued by the European Patent Office on Jun. 22, 2022.
Office Action for the Chinese Patent Application No. 201910601040.4 issued by the Chinese Patent Office.
Office Action for the Indian Patent Application No. 202227003586 issued by the Indian Patent Office on Jun. 10, 2022.
Notice of Reasons for Refusal for the Japanese Patent Application No. 2021-578153 issued by the Japanese Patent Office on Dec. 13, 2022.
International Search Report and Written Opinion issued by the Chinese Patent Office on Sep. 23, 2020.

* cited by examiner

UPLINK TRANSMISSION PROCESSING METHOD, INFORMATION CONFIGURATION METHOD, AND RELATED DEVICE

CROSS-REFERENCE TO RELATED APPLICATION

This application is a Bypass Continuation Application of PCT/CN2020/097991 filed on Jun. 24, 2020, which claims priority to Chinese Patent Application No. 201910601040.4 filed on Jul. 4, 2019, which are incorporated herein by reference in their entirety.

TECHNICAL FIELD

This disclosure relates to the field of communications technologies, and in particular, to an uplink transmission processing method, an information configuration method, and a related device.

BACKGROUND

Some communications systems allow in-device coexistence (IDC) for terminals. That is, one terminal may be equipped with a variety of different wireless transceivers, for example, wireless transceivers for 4G, 5G, Wi-Fi, Bluetooth, a positioning system, and the like. In this case, at adjacent frequencies or harmonic frequencies, a receiver of the terminal may be interfered with by a transmitter of the terminal, and such interference may be caused by the same or different radio access technologies (RAT). Therefore, terminals are currently faced with a problem of considerable interference.

SUMMARY

According to a first aspect, an embodiment of this disclosure provides an uplink transmission processing method, applied to a terminal and including:
 obtaining configuration information, where the configuration information is used to indicate uplink transmission stop information in a first absolute time period, or the configuration information is configuration information for stopping uplink transmission on a first resource; and
 stopping uplink transmission based on the obtained configuration information.

According to a second aspect, an embodiment of this disclosure provides an information configuration method, applied to a network device and including:
 transmitting configuration information, where the configuration information is used to indicate uplink transmission stop information in a first absolute time period, or the configuration information is configuration information for stopping uplink transmission on a first resource.

According to a third aspect, an embodiment of this disclosure provides a terminal, including:
 an obtaining module, configured to obtain configuration information, where the configuration information is used to indicate uplink transmission stop information in a first absolute time period, or the configuration information is configuration information for stopping uplink transmission on a first resource; and
 a stopping module, configured to stop uplink transmission based on the obtained configuration information.

According to a fourth aspect, an embodiment of this disclosure provides a network device, including:
 a transmission module, configured to transmit configuration information, where the configuration information is used to indicate uplink transmission stop information in a first absolute time period, or the configuration information is configuration information for stopping uplink transmission on a first resource.

According to a fifth aspect, an embodiment of this disclosure provides a terminal, including: a memory, a processor, and a program stored in the memory and executable on the processor, where when the program is executed by the processor, the steps of the uplink transmission processing method provided in the embodiments of this disclosure are implemented.

According to a sixth aspect, an embodiment of this disclosure provides a network device, including: a memory, a processor, and a program stored in the memory and executable on the processor, where when the program is executed by the processor, the steps of the information configuration method provided in the embodiments of this disclosure are implemented.

According to a seventh aspect, an embodiment of this disclosure provides a non-transitory computer-readable storage medium, where the non-transitory computer-readable storage medium stores a computer program, and when the computer program is executed by a processor, the steps of the uplink transmission processing method provided in the embodiments of this disclosure are implemented, or when the computer program is executed by a processor, the steps of the information configuration method provided in the embodiments of this disclosure are implemented.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure shall fall within the protection scope of this disclosure.

Terms "include" and any other variants thereof in the specification and claims of this application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. Moreover, use of "and/or" in the specification and claims represents at least one of the associated objects. For example, A and/or B means three cases: A alone, B alone, or both A and B.

In the embodiments of this disclosure, terms such as "an example" or "for example" are used to represent an example, an instance, or an illustration. Any embodiment or design solution described as "an example" or "for example" in the embodiments of this disclosure should not be construed as being more preferred or having more advantages than other embodiments or design solutions. Specifically, the terms such as "an example" or "for example" are intended to present related concepts in a specific manner.

The following describes the embodiments of this disclosure with reference to the accompanying drawings. An uplink transmission processing method, an information configuration method, and a related device that are provided in the embodiments of this disclosure may be applied to a wireless communications system. The wireless communications system may be a new radio (NR) system, an evolved long term evolution (eLTE) system, a long term evolution (LTE) system, a subsequent evolved communications system, or the like.

Figure 1:
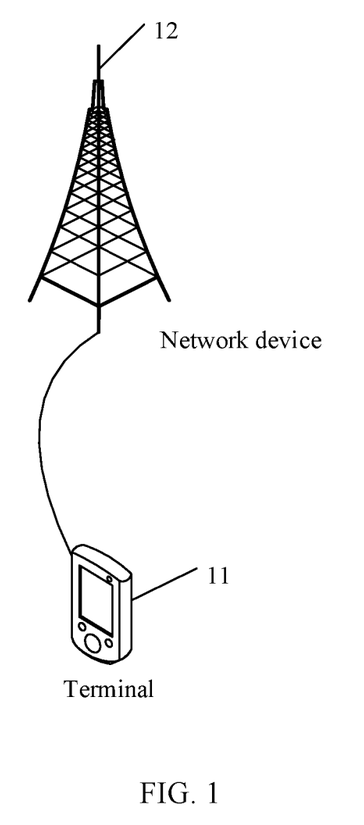
FIG. 1 is a structural diagram of a network system to which an embodiment of this disclosure is applicable.

Referring to FIG. 1, FIG. 1 is a structural diagram of a network system to which an embodiment of this disclosure is applicable. As shown in FIG. 1, the network system includes a terminal 11 and a network device 12. The terminal 11 may be user equipment (UE) or other terminal-side devices such as a mobile phone, a tablet personal computer, a laptop computer, a personal digital assistant (PDA), a mobile Internet device (MID), a wearable device, or a robot. It should be noted that a specific type of the terminal 11 is not limited in the embodiments of this disclosure. The network device 12 may be a 4G base station, a 5G base station, a base station of a later version, or a base station in other communications systems, or may be referred to as a NodeB, an evolved NodeB, a transmission reception point (TRP), an access point (AP), or other terms in the field. Provided that a same technical effect is achieved, the network device is not limited to a specific technical term. In addition, the network device 12 may be a master node (MN) or a secondary node (SN). It should be noted that, in the embodiments of this disclosure, the 5G base station is used as only an example, but the network device is not limited to a specific type.

Figure 2:
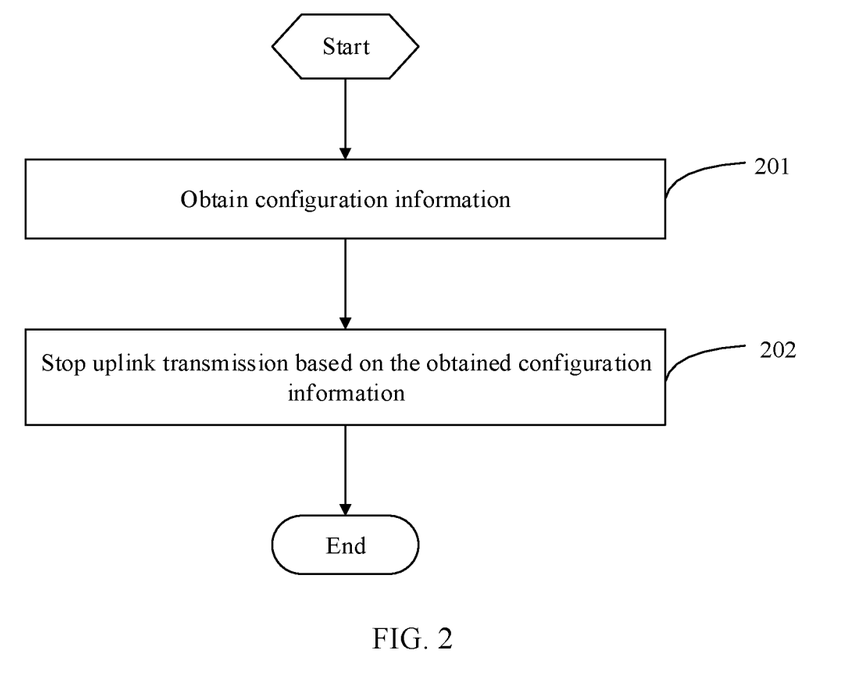
FIG. 2 is a flowchart of an uplink transmission processing method according to an embodiment of this disclosure.

Referring to FIG. 2, FIG. 2 is a flowchart of an uplink transmission processing method according to an embodiment of this disclosure. As shown in FIG. 2, the method is applied to a terminal and includes the following steps.

Step 201: Obtain configuration information, where the configuration information is used to indicate uplink transmission stop information in a first absolute time period, or the configuration information is configuration information for stopping uplink transmission on a first resource.

Herein, the foregoing first absolute time period may be a time period calculated in absolute time units, such as 10 ms, 20 ms, or 5 ms, other than a time period calculated in time domain resources (subframes, slots, or the like).

In addition, the foregoing first absolute time period is configured by the foregoing configuration information. For example, the foregoing configuration information is used to indicate uplink transmission stop information within 10 ms, such as the quantity, proportion or duration of stoppable uplink transmissions within 10 ms.

Because the foregoing configuration information indicates the uplink transmission stop information within the absolute time period, the terminal and a network side can have a consistent understanding on the foregoing uplink transmission stop information when a time granularity of time domain resource is switched due to resource switching performed by the terminal, such as bandwidth part (BWP) switching, cell switching, or time granularity switching. For example, when the terminal performs the BWP switching, a length of a slot becomes greater, but the terminal does not change the quantity of stoppable uplink transmissions in the first absolute time period with the length change of the slot, thereby avoiding that the terminal is unable to effectively reduce interference based on a network configuration.

In addition, in this embodiment of this disclosure, the uplink transmission stop information in the first absolute time period is applicable to a specific resource (for example, a specific cell or a specific BWP), or all resources used in the terminal. This is not limited herein.

The configuration information is configuration information for stopping uplink transmission on a first resource, which may be that the configuration information is only used for stopping uplink transmission on the first resource. In this way, when the terminal performs resource switching, the terminal can use the corresponding configuration information, so that the terminal and the network side use the same configuration information, thereby avoiding that the terminal is unable to effectively reduce interference based on the network configuration. In addition, the foregoing first resource may be a resource such as a specific cell, a specific BWP, a specific time granularity, or a specific cell group.

In addition, the foregoing configuration information for stopping uplink transmission may be uplink transmission stop information in a plurality of time domain resources, for example, the quantity or proportion of stoppable uplink transmissions in the plurality of time domain resources, or the quantity of time domain resources stopping uplink transmission in the plurality of time domain resources. Herein, the time domain resource may be a subframe, a slot, or a symbol. Taking the subframe for example, the configuration information for stopping uplink transmission may indicate that uplink transmission in 20 subframes can be stopped during uplink transmission in 200 subframes, or the configuration information for stopping uplink transmission may indicate that uplink transmission can be stopped 20 times during uplink transmission in 200 subframes. Alternatively, the foregoing configuration information for stopping uplink transmission may include: the proportion of stoppable uplink transmissions. The proportion may be a maximum proportion of uplink transmissions that can be stopped by the terminal. For example, during uplink transmission in 10 slots or subframes configured by the network side, the maximum proportion of uplink transmissions that can be stopped is 10%. For another example, in all of 10 slots (including uplink and downlink slots) configured by the network side, the maximum proportion of uplink transmissions that can be stopped is 10%. For still another example, in all of 10 subframes (including uplink and downlink subframes) configured by the network side, the maximum proportion of uplink transmissions that can be stopped is 10%.

The uplink transmission stop information in the first absolute time period may indicate an uplink transmission stop range in the first absolute time period, for example, the maximum quantity of stops, maximum proportion of stops, or maximum absolute stop time in the first absolute time period. Certainly, this is not limited. For example, the uplink transmission stop information in the first absolute time period may indicate absolute behavior of stopping uplink transmission in the first absolute time period, for example, the required quantity of stops, required proportion of stops, or required absolute stop time in the first absolute time period.

In addition, the foregoing configuration information for stopping uplink transmission may indicate an uplink transmission stop range in N time domain resources, for example, the maximum quantity of stops or maximum proportion of stops in the N time domain resources, or the maximum quantity of time domain resources stopping uplink transmission in the N time domain resources. Certainly, this is not limited. For example, the foregoing configuration information for stopping uplink transmission may indicate absolute behavior of stopping uplink transmission in the N time domain resources, for example, the required quantity of stops or required proportion of stops in the N time domain resources, or the quantity of time domain resources needing to stop uplink transmission in the N time domain resources, where N is an integer greater than 1.

It should be noted that the foregoing first absolute time period can be a time cycle, so that the foregoing configuration information can be used to configure the terminal to stop uplink transmission periodically. Certainly, the foregoing first absolute time period can alternatively be a special time range, that is, the terminal stops uplink transmission only in the time range corresponding to the configuration information. Similarly, the foregoing configuration information for stopping uplink transmission on the first resource can be used to configure the terminal to periodically stop uplink transmission based on the configuration information, or can be used to configure the terminal to stop uplink transmission only during special time.

In addition, the obtaining configuration information may be receiving configuration information sent by the network device. Certainly, this is not limited. For example, the configuration information may be preconfigured by the terminal, or configuration information prescribed in a protocol for use by the terminal in the case of interference in an IDC technology.

Step 202: Stop uplink transmission based on the obtained configuration information.

When the terminal obtains the configuration information in step 201, the terminal can directly stop uplink transmission based on the configuration information. For example, the uplink transmission stop information in the first absolute time period may indicate the maximum quantity of stops, maximum proportion of stops, or maximum absolute stop time in the first absolute time period, so that uplink transmission is stopped within the first absolute time period directly based on the maximum quantity of stops, maximum proportion of stops, or maximum absolute stop time. For example, if the maximum quantity of stops within 10 ms is 2, then the terminal can stop one or two uplink transmissions within 10 ms. For another example, the foregoing configuration information for stopping uplink transmission may indicate the maximum quantity of stops, maximum proportion of stops, or maximum absolute stop time in the N time domain resources, so that uplink transmission is stopped within the N time domain resources directly based on the maximum quantity of stops, maximum proportion of stops, or maximum absolute stop time.

It should be noted that the stopping uplink transmission may be stopping uplink transmission for a first RAT in a plurality of RATs supported by the terminal, where the first RAT corresponds to the configuration information obtained in step 201. For example, the configuration information obtained in step 201 is received through the first RAT. Certainly, this is not limited. For example, a network side in a 5G RAT can also perform configuration to stop uplink transmission for at least one RAT in Wi-Fi, Bluetooth, or a positioning system.

In addition, the stopping uplink transmission based on the obtained configuration information may be stopping partial uplink transmission, such as stopping partial uplink transmission for the first RAT before a first deadline. Certainly, this is not limited. For example, in some special scenarios, all uplink transmission in a specific time or frequency domain resource can be stopped, which can be specifically configured based on an actual condition.

In this embodiment of this disclosure, the uplink transmission is stopped based on the obtained configuration information in the foregoing step, so that interference to the terminal can be reduced. For example, if the foregoing configuration information indicates that a maximum of two uplink transmissions can be stopped within 10 ms, the terminal stops one or two uplink transmissions in 10 ms, to reduce the interference to the terminal.

In an optional implementation, the configuration information is used to indicate a quantity of stoppable uplink transmissions in the first absolute time period; or
  the configuration information is used to indicate a proportion of stoppable uplink transmissions in the first absolute time period; or
  the configuration information is used to indicate a duration of stoppable uplink transmissions in the first absolute time period.

In this implementation, the quantity or proportion of uplink transmissions that can be stopped in a period of time may be indicated by using absolute time. In addition, total duration of uplink transmissions that can be stopped in a period of time can also be indicated by using absolute time.

In this implementation, the terminal can be flexibly instructed to stop uplink transmission.

In a solution, the quantity of stoppable uplink transmissions is a maximum quantity of stoppable uplink transmissions in the first absolute time period; or
  the proportion of stoppable uplink transmissions is a maximum proportion of stoppable uplink transmissions in the first absolute time period; or
  the duration of stoppable uplink transmissions is a maximum duration of stoppable uplink transmissions in the first absolute time period.

For example, if the quantity of uplink transmissions that can be stopped in 10 ms is 2, the network side configures a time interval value (period=10 ms) and a maximum quantity of uplink transmissions that can be stopped (maximumDrop=2). For another example, if the maximum proportion of uplink transmissions that can be stopped in 10 ms is 10% (for example, if 1 out of 10 uplink transmissions can be stopped, the proportion is 10%), the network side configures a time interval value (period=10 ms) and a maximum proportion of uplink transmissions that can be stopped (maximumRate=10%).

For example, if the total duration of uplink transmissions that can be stopped in 10 ms is 2 ms, the network side configures a time interval value (period=10 ms) and a maximum total duration of uplink transmissions that can be stopped (maximumTime=2).

In this way, based on the configuration information in step 201, the terminal can stop uplink transmission within the maximum uplink transmission stop range configured by the network side. For example, if the network side configures that a maximum of two uplink transmissions can be stopped in 10 ms on a BWP1 of a cell 1 for the terminal, the terminal can stop a maximum of two uplink transmissions in 10 ms.

In another solution, the quantity of stoppable uplink transmissions may be a quantity of uplink transmissions that need to be stopped in the first absolute time period; or the proportion of stoppable uplink transmissions is a maximum proportion of uplink transmissions that need to be stopped in the first absolute time period; or the duration of stoppable uplink transmissions is maximum duration of uplink transmissions that need to be stopped in the first absolute time period.

In this way, according to the configuration information in step 201, the terminal stops uplink transmission based on the uplink transmissions that need to be stopped as configured by the network side. For example, if the network side configures that two uplink transmissions need to be stopped in 10 ms on a BWP1 of a cell 1 for the terminal, the terminal stops two uplink transmissions in 10 ms.

Optionally, the foregoing proportion is:

a proportion of the quantity of stoppable uplink transmissions in a total quantity of uplink transmissions; or a proportion of the quantity of stoppable uplink transmissions in a total quantity of uplink and downlink transmissions.

Herein, the total quantity of uplink transmissions may be a total quantity of uplink transmissions in the first absolute time period, and the total quantity of uplink transmissions and downlink transmissions may be a sum of total uplink transmissions and total downlink transmissions in the first absolute time period. For example, a maximum quantity of uplink transmissions that can be stopped in 10 uplink transmissions in 20 ms is 2; or a maximum quantity of uplink transmissions that can be stopped in 10 uplink transmissions and downlink transmissions in 20 ms is 2.

In an optional implementation, the configuration information for stopping uplink transmission is used to indicate uplink transmission stop information in N time domain resources, where N is an integer greater than 1; and the first resource is a resource, in the time domain resources, whose time granularity information is a first time granularity.

Herein, the foregoing uplink transmission stop information in the N time domain resources may be the quantity of stoppable uplink transmissions, proportion of stoppable uplink transmissions, or quantity of time domain resources stopping uplink transmission in the N time domain resources, for example, the maximum quantity of stoppable uplink transmissions, maximum proportion of stoppable uplink transmissions, or maximum quantity of time domain resources stopping uplink transmission in the N time domain resources. Herein, the proportion of stoppable uplink transmissions may be a proportion of time domain resources stopping uplink transmissions in all time domain resources for uplink transmission, or a proportion of time domain resources stopping uplink transmission in all time domain resources for uplink and downlink transmissions.

In addition, the foregoing time domain resource may be a subframe, a slot, a symbol, or the like. Herein, in this embodiment of this disclosure, a slot as a time domain resource is used as an example for illustration. For example, the foregoing first time granularity is a slot granularity with a 15 kHz subcarrier spacing (SCS), or the foregoing first time granularity is a slot granularity corresponding to the BWP1 of the cell 1.

In this implementation, the foregoing uplink transmission stop information in the N time domain resources can be only applied to a resource, in the time domain resources, whose time granularity information is the first time granularity. In this way, when the terminal switches a resource, if the time granularity information does not change, the terminal continues using the uplink transmission stop information; or if the time granularity information changes, the terminal stops uplink transmission by using changed resource configuration information, to ensure that the terminal and the network side use the same configuration information, thereby avoiding that the terminal cannot effectively reduce interference based on a network configuration.

It should be noted that in this embodiment of this disclosure, the terminal can obtain configuration information corresponding to a plurality of resources, for example, configuration information for stopping uplink transmission on the first resource, and configuration information for stopping uplink transmission on a second resource. The first resource and the second resource may have different time granularities.

In addition, the first time granularity may be configured in the configuration information obtained in step 201. For example, the first time granularity is configured through at least one of:

a subcarrier spacing, a cell identifier, a cell group identifier, a BWP identifier, or an absolute time granularity.

For example, when a subcarrier spacing is configured in the configuration information, the terminal may determine that the first time granularity is a time granularity corresponding to the subcarrier spacing, for example, a time granularity of a slot, OFDM symbol, or subframe corresponding to the SCS of 15 kHz.

For example, when a cell identifier is configured in the configuration information, the terminal may determine that the first time granularity is a time granularity corresponding to the cell identifier, for example, a time granularity of a slot, OFDM symbol, or subframe corresponding to a primary cell (PCell) or a secondary cell (SCell).

For example, when a cell group identifier is configured in the configuration information, the terminal may determine that the first time granularity is a time granularity corresponding to the cell group identifier, for example, a time granularity of a slot, OFDM symbol, or subframe corresponding to a master cell group (MCG) or a secondary cell group (SCG).

For example, when a BWP identifier is configured in the configuration information, the terminal may determine that the first time granularity is a time granularity corresponding to the BWP identifier, for example, a time granularity of a slot, OFDM symbol, or subframe corresponding to the BWP1.

For example, an identifier of an absolute time granularity is configured in the configuration information, the terminal may determine that the absolute time granularity, for example, a time granularity of 1 ms, is the first time granularity.

It should be noted that the foregoing only uses the first time granularity configured through one of the plurality of items as an example for illusion. In this implementation, the first time granularity can be configured through the plurality of items. For example, a cell identifier and a BWP identifier are configured, to indicate a time granularity of a BWP corresponding to the BWP identifier in a cell corresponding to the cell identifier, or the like. Details are not enumerated herein.

In this implementation, time granularity information used as a reference for the configuration information for stopping uplink transmission may be specified. For example, the configuration information for stopping uplink transmission that is configured by the network device indicates that in 10 slots, a maximum quantity of slots in which uplink transmission can be stopped is 2, and the time granularity information corresponding to the slot is configured as a slot granularity corresponding to an SCS of 15 kHz; or the time granularity information corresponding to the slot is configured as a slot granularity corresponding to the BWP1 of the cell 1.

Because the time granularity is used to indicate a resource to which the configuration information for stopping uplink transmission is applicable, when the terminal switches a resource, resources before and after the switching have the same time granularity, and the terminal does not need to change the configuration information for stopping uplink transmission, to reduce complexity and configuration overheads.

In an optional implementation, the configuration information for stopping uplink transmission is used to indicate uplink transmission stop information in N time domain resources, where N is an integer greater than 1; and the first resource is a first BWP or a first cell.

Herein, for the uplink transmission stop information in the N time domain resources, reference may be made to the corresponding description in the foregoing implementations. Details are not described herein again.

In addition, the first BWP or first cell may be indicated in the configuration information for stopping uplink transmission. In addition, the first BWP may be one or more BWPs, and the first cell may be one or more cells.

In this implementation, the configuration information for stopping uplink transmission that is configured for a specific BWP or a specific cell can be specified. For example, the network side configures, for the BWP1 of the cell 1 of the terminal, configuration information 1 for stopping uplink transmission. For example, in a maximum of 2 out of 10 slots, the terminal can stop uplink transmission on the BWP1 of the cell 1. For another example, the network side configures, for the BWP2 of the cell 1 of the terminal, configuration information 2 for stopping uplink transmission. For example, in a maximum of 1 out of 20 slots, the terminal can stop uplink transmission on a BWP2 of the cell 1.

Because the resource to which the configuration information for stopping uplink transmission is applicable is indicated, after the terminal performs resource switching, the terminal stops uplink transmission by using configuration information of a new resource, to ensure that the terminal and the network side use the same configuration information, thereby avoiding that the terminal cannot effectively reduce interference based on the network configuration.

In an optional implementation, the stopping uplink transmission based on the obtained configuration information includes:
  if resource switching occurs in the terminal, resetting an uplink transmission stop count collected by the terminal, and stopping uplink transmission based on the obtained configuration information; or
  if resource switching occurs in the terminal, on the basis of an uplink transmission stop count collected by the terminal, stopping uplink transmission based on the obtained configuration information.

Herein, the resource switching may be BWP switching, time granularity switching of resources, cell switching, or the like. For example, the terminal performs BWP switching, or time granularity switching occurs in an operating frequency range of the terminal, such as an SCS change of an activated BWP of the terminal, or cell activation or deactivation occurs, such as deactivation of the cell 1 of the terminal.

The stopping uplink transmission based on the obtained configuration information may be stopping uplink transmission based on the obtained configuration information used for the resource used by the terminal after switching. For example, the obtained configuration information includes first configuration information of a resource used by the terminal before the resource switching and second configuration information of a resource used by the terminal after the resource switching, and the stopping uplink transmission based on the obtained configuration information includes:
  stopping uplink transmission based on the second configuration information.

Herein, the foregoing second configuration information of a resource used by the terminal after resource switching refers to the configuration information used for the newly switched resource of the terminal.

This can ensure that the terminal and the network side use the same configuration information, thereby avoiding that the terminal cannot effectively reduce interference based on the network configuration.

It should be noted that if the configuration information obtained by the terminal is used to indicate the uplink transmission stop information in the first absolute time period, the terminal does not need to change the configuration information.

In addition, the resetting an uplink transmission stop count collected by the terminal, and the stopping uplink transmission based on the obtained configuration information may be resetting the uplink transmission stop count collected by the terminal when switching is performed, that is, if there are uplink transmissions stopped before the switching, the quantity of stoppable uplink transmissions is reset after the switching. For example, the uplink transmission stop count is reset. For example, if the terminal can stop two uplink transmissions in 10 ms, and one uplink transmission stop has been performed in 5 ms before the terminal performs resource switching, the terminal considers that no uplink transmission has been stopped in the previous 5 ms, and the terminal can stop two uplink transmissions in the remaining 5 ms. That is, when the terminal resets the uplink transmission stop count collected by the terminal, absolute time or a time domain resource corresponding to the configuration information may not be reset. Certainly, when the uplink transmission stop count collected by the terminal is being reset, the absolute time or time domain resource corresponding to the configuration information may alternatively be reset. The uplink transmission stop count is reset. For example, if the terminal can stop two uplink transmissions in 10 ms, and one uplink transmission stop has been performed in 5 ms before the terminal performs resource switching, the terminal resets the uplink transmission stop count 1 to 0; and starts, from time after the switching, uplink transmission stop, meaning that the terminal can stop two uplink transmissions in the next 10 ms.

On the basis of an uplink transmission stop count collected by the terminal, the stopping uplink transmission based on the obtained configuration information may mean that after the resource switching, the uplink transmission stop count collected by the terminal is still used without being reset, and uplink transmission is stopped. For example, the uplink transmission stop count is not reset, but new configuration information is used to continue counting. For example, for the time granularity corresponding to a 15 kHz SCS, the network configures that the terminal can stop 2 out of 10 uplink transmissions; and for the time granularity corresponding to a 30 kHz SCS, the network configures that the terminal can stop 1 out of 10 uplink transmissions. The terminal operates on a BWP corresponding a 15 kHz SCS previously, and has stopped one (or two) uplink transmission (s) in the previous 5 transmissions. When the SCS of the operating BWP of the terminal changes to 30 kHz, the terminal considers that one uplink transmission stop has been performed in the previous 5 uplink transmissions, and the terminal can no longer stop uplink transmission in the subsequent 5 uplink transmissions. For another example, for the BWP1 of the cell 1, the network configures that the terminal can stop 2 out of 10 uplink transmissions; and for the BWP2 of the cell 1, the network configures that the terminal can stop 1 out of 10 uplink transmissions. The previous operating BWP of the terminal is the BWP1, on which the terminal has stopped one (or two) uplink transmission(s) in the previous 5 transmissions. When the operating BWP of the terminal changes to BWP2, the terminal considers that one uplink transmission stop has been performed in the previous 5 uplink transmissions, and the terminal can no longer stop uplink transmission in the subsequent 5 uplink transmissions.

In the foregoing implementation, the uplink transmission stop count collected by the terminal may or may not be reset, to satisfy requirements for different services or scenarios, thereby improving compatibility.

In this embodiment of this disclosure, the following can be implemented:

The specific configuration information for stopping uplink transmission that is transmitted by the network side to the terminal includes any one of the following:

1. a quantity or a proportion of uplink transmissions that can be stopped in a period of time, indicated by using absolute time;
2. total duration of uplink transmissions that can be stopped in a period of time, indicated by using absolute time;
3. time granularity information used as a reference for the configuration information for stopping uplink transmission; and
4. configuration information for stopping uplink transmission that is configured for a specific BWP (or cell).

The terminal can stop uplink transmission within the maximum uplink transmission stop range configured by the network side.

In addition, when BWP switching occurs in the terminal, a time granularity of an operating frequency range of the terminal changes (for example, an SCS of an activated BWP of the terminal changes), or a cell activation or deactivation occurs (for example, the cell 1 of the terminal is deactivated), behavior of the terminal includes any one of the following:

resetting the uplink transmission stop count; and
continuing counting by using a new configuration parameter without resetting the uplink transmission stop count.

In the method provided in this embodiment of this disclosure, when the terminal operates in frequency ranges with different time granularities, the network side and the terminal side can have a consistent understanding on the time granularity for stopping uplink transmission. In addition, when the operating frequency range or time granularity of the terminal changes, the network side and the terminal side can still have a consistent understanding on the uplink transmission stop count. This can avoid an excessively large number of stopped uplink transmissions that exceeds the network configuration, and also avoid an excessively small number of stopped uplink transmissions by the terminal.

Figure 3:
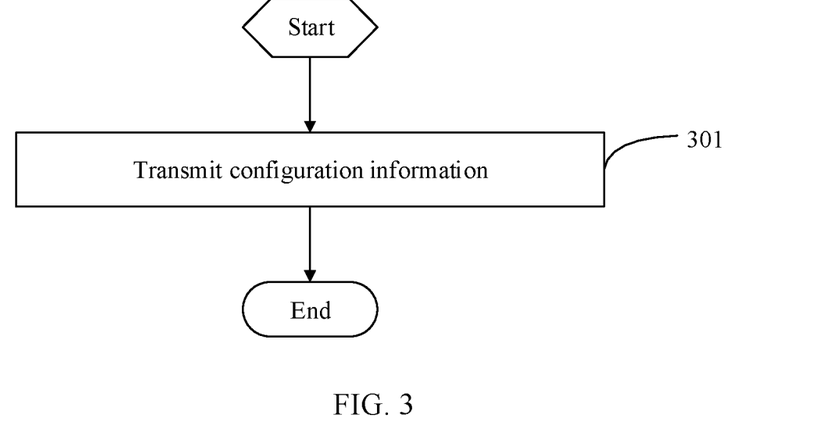
FIG. 3 is a flowchart of an information configuration method according to an embodiment of this disclosure.

Referring to FIG. 3, FIG. 3 is a flowchart of an information configuration method according to an embodiment of this disclosure. As shown in FIG. 3, the method is applied to a network device and includes the following steps.

Step 301: Transmit configuration information, where the configuration information is used to indicate uplink transmission stop information in a first absolute time period, or the configuration information is configuration information for stopping uplink transmission on a first resource.

Optionally, the configuration information is used to indicate a quantity of stoppable uplink transmissions in the first absolute time period; or
  the configuration information is used to indicate a proportion of stoppable uplink transmissions in the first absolute time period; or
  the configuration information is used to indicate a duration of stoppable uplink transmissions in the first absolute time period.

Optionally, the quantity of stoppable uplink transmissions is a maximum quantity of stoppable uplink transmissions in the first absolute time period; or
  the proportion of stoppable uplink transmissions is a maximum proportion of stoppable uplink transmissions in the first absolute time period; or
  the duration of stoppable uplink transmissions is a maximum duration of stoppable uplink transmissions in the first absolute time period.

Optionally, the proportion is:
  a proportion of the quantity of stoppable uplink transmissions in a total quantity of uplink transmissions; or
  a proportion of the quantity of stoppable uplink transmissions in a total quantity of uplink and downlink transmissions.

Optionally, the configuration information for stopping uplink transmission is used to indicate uplink transmission stop information in N time domain resources, where N is an integer greater than 1; and
  the first resource is a resource, in the time domain resources, whose time granularity information is a first time granularity, or the first resource is a first bandwidth part BWP or a first cell.

Optionally, the first time granularity is configured through at least one of:
  a subcarrier spacing, a cell identifier, a cell group identifier, a BWP identifier, or an absolute time granularity.

It should be noted that for an implementations of this embodiment as an implementation of the network device side corresponding to the embodiment shown in FIG. 2, reference may be made to the relevant descriptions about the embodiment shown in FIG. 2. To avoid repetition, details are not described again in this embodiment. In this embodiment, interference can also be reduced for the terminal.

Figure 4:
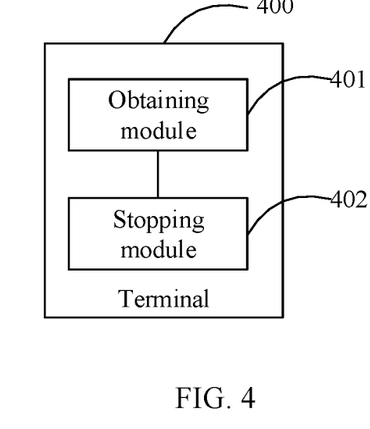
FIG. 4 is a structural diagram of a terminal according to an embodiment of this disclosure.

Referring to FIG. 4, FIG. 4 is a structural diagram of a terminal according to an embodiment of this disclosure. As shown in FIG. 4, the terminal 400 includes:

an obtaining module 401, configured to obtain configuration information, where the configuration information is used to indicate uplink transmission stop information in a first absolute time period, or the configuration information is configuration information for stopping uplink transmission on a first resource; and
a stopping module 402, configured to stop uplink transmission based on the obtained configuration information.

Optionally, the configuration information is used to indicate a quantity of stoppable uplink transmissions in the first absolute time period; or the configuration information is used to indicate a proportion of stoppable uplink transmissions in the first absolute time period; or the configuration information is used to indicate a duration of stoppable uplink transmissions in the first absolute time period.

Optionally, the quantity of stoppable uplink transmissions is a maximum quantity of stoppable uplink transmissions in the first absolute time period; or the proportion of stoppable uplink transmissions is a maximum proportion of stoppable uplink transmissions in the first absolute time period; or the duration of stoppable uplink transmissions is a maximum duration of stoppable uplink transmissions in the first absolute time period.

Optionally, the proportion is:

a proportion of the quantity of stoppable uplink transmissions in a total quantity of uplink transmissions; or a proportion of the quantity of stoppable uplink transmissions in a total quantity of uplink and downlink transmissions.

Optionally, the configuration information for stopping uplink transmission is used to indicate uplink transmission stop information in N time domain resources, where N is an integer greater than 1; and the first resource is a resource, in the time domain resources, whose time granularity information is a first time granularity, or the first resource is a first bandwidth part BWP or a first cell.

Optionally, the first time granularity is configured through at least one of:

a subcarrier spacing, a cell identifier, a cell group identifier, a BWP identifier, or an absolute time granularity.

Optionally, the stopping module is configured to: if resource switching occurs in the terminal, reset an uplink transmission stop count collected by the terminal, and stop uplink transmission based on the obtained configuration information; or the stopping module is configured to: if resource switching occurs in the terminal, on the basis of an uplink transmission stop count collected by the terminal, stop uplink transmission based on the obtained configuration information.

Optionally, the resource switching is: BWP switching, time granularity switching of resources, or cell switching.

Optionally, the obtained configuration information includes first configuration information of a resource used by the terminal before the resource switching and second configuration information of a resource used by the terminal after the resource switching, and the stopping uplink transmission based on the obtained configuration information includes:

stopping uplink transmission based on the second configuration information.

The terminal provided in this embodiment of this disclosure can implement the processes implemented by the terminal in the method embodiment in FIG. 2. To avoid repetition, details are not described herein again. In addition, interference can be reduced for the terminal.

Figure 5:
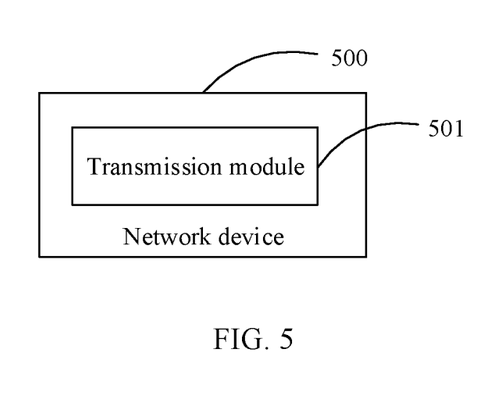
FIG. 5 is a structural diagram of a network device according to an embodiment of this disclosure.

Referring to FIG. 5, FIG. 5 is a structural diagram of a network device according to an embodiment of this disclosure. As shown in FIG. 5, the network device 500 includes:

a transmission module 501, configured to transmit configuration information, where the configuration information is used to indicate uplink transmission stop information in a first absolute time period, or the configuration information is configuration information for stopping uplink transmission on a first resource.

Optionally, the configuration information is used to indicate a quantity of stoppable uplink transmissions in the first absolute time period; or the configuration information is used to indicate a proportion of stoppable uplink transmissions in the first absolute time period; or the configuration information is used to indicate a duration of stoppable uplink transmissions in the first absolute time period.

Optionally, the quantity of stoppable uplink transmissions is a maximum quantity of stoppable uplink transmissions in the first absolute time period; or the proportion of stoppable uplink transmissions is a maximum proportion of stoppable uplink transmissions in the first absolute time period; or the duration of stoppable uplink transmissions is a maximum duration of stoppable uplink transmissions in the first absolute time period.

Optionally, the proportion is:

a proportion of the quantity of stoppable uplink transmissions in a total quantity of uplink transmissions; or a proportion of the quantity of stoppable uplink transmissions in a total quantity of uplink and downlink transmissions.

Optionally, the configuration information for stopping uplink transmission is used to indicate uplink transmission stop information in N time domain resources, where N is an integer greater than 1; and the first resource is a resource, in the time domain resources, whose time granularity information is a first time granularity, or the first resource is a first bandwidth part BWP or a first cell.

Optionally, the first time granularity is configured through at least one of:

a subcarrier spacing, a cell identifier, a cell group identifier, a BWP identifier, or an absolute time granularity.

The network device provided by this embodiment of this disclosure can implement the processes implemented by the network device in the method embodiment in FIG. 3. To avoid repetition, details are not described again herein. In addition, interference can be reduced for the terminal.

Figure 6:
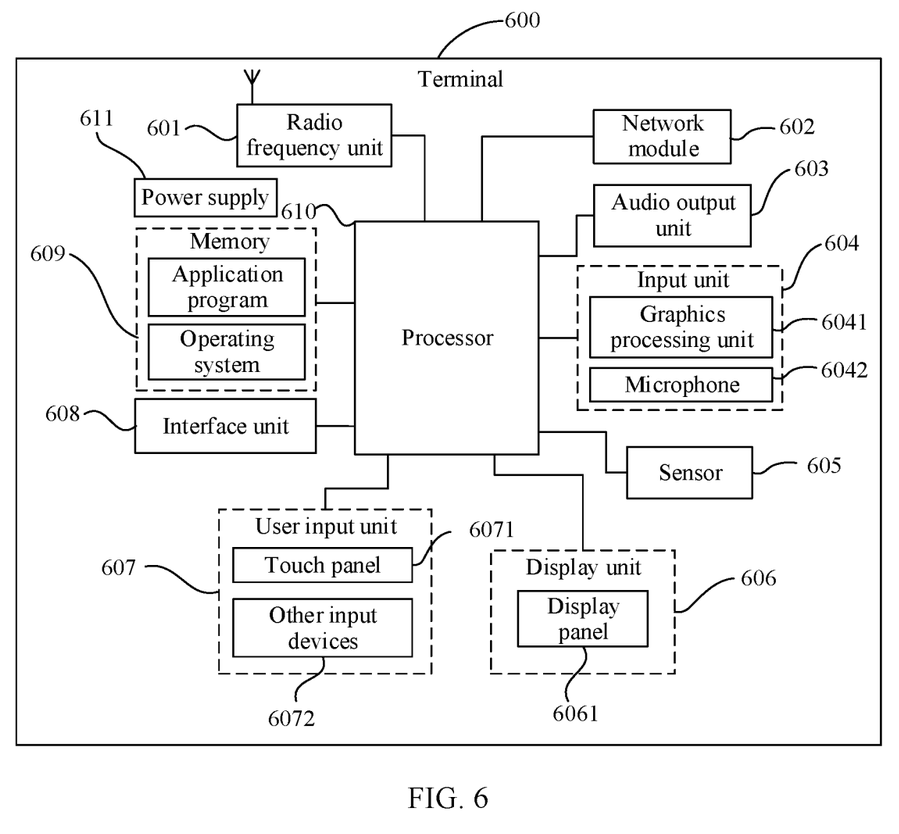
FIG. 6 is a structural diagram of another terminal according to an embodiment of this disclosure.

FIG. 6 is a schematic diagram of a hardware structure of a terminal for implementing the embodiments of this disclosure.

The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. Persons skilled in the art may understand that the structure of the terminal shown in FIG. 6 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a robot, a wearable device, a pedometer, or the like.

The radio frequency unit 601 is configured to obtain configuration information, where the configuration information is used to indicate uplink transmission stop information in a first absolute time period, or the configuration information is configuration information for stopping uplink transmission on a first resource.

The processor 610 is configured to stop uplink transmission based on the obtained configuration information.

Optionally, the configuration information is used to indicate a quantity of stoppable uplink transmissions in the first absolute time period; or the configuration information is used to indicate a proportion of stoppable uplink transmissions in the first absolute time period; or the configuration information is used to indicate a duration of stoppable uplink transmissions in the first absolute time period.

Optionally, the quantity of stoppable uplink transmissions is a maximum quantity of stoppable uplink transmissions in the first absolute time period; or the proportion of stoppable uplink transmissions is a maximum proportion of stoppable uplink transmissions in the first absolute time period; or the duration of stoppable uplink transmissions is a maximum duration of stoppable uplink transmissions in the first absolute time period.

Optionally, the proportion is:

a proportion of the quantity of stoppable uplink transmissions in a total quantity of uplink transmissions; or a proportion of the quantity of stoppable uplink transmissions in a total quantity of uplink and downlink transmissions.

Optionally, the configuration information for stopping uplink transmission is used to indicate uplink transmission stop information in N time domain resources, where N is an integer greater than 1; and the first resource is a resource, in the time domain resources, whose time granularity information is a first time granularity, or the first resource is a first bandwidth part BWP or a first cell.

Optionally, the first time granularity is configured through at least one of:

a subcarrier spacing, a cell identifier, a cell group identifier, a BWP identifier, or an absolute time granularity.

Optionally, the stopping uplink transmission based on the obtained configuration information includes:

if resource switching occurs in the terminal, resetting an uplink transmission stop count collected by the terminal, and stopping uplink transmission based on the obtained configuration information; or if resource switching occurs in the terminal, on the basis of an uplink transmission stop count collected by the terminal, stopping uplink transmission based on the obtained configuration information.

Optionally, the resource switching is: BWP switching, time granularity switching of resources, or cell switching.

Optionally, the obtained configuration information includes first configuration information of a resource used by the terminal before the resource switching and second configuration information of a resource used by the terminal after the resource switching, and the stopping uplink transmission based on the obtained configuration information includes:

stopping uplink transmission based on the second configuration information.

The foregoing terminal can reduce the interference to the terminal.

It should be understood that in an embodiment of this disclosure, the radio frequency unit 601 may be configured to: receive and send signals in an information receiving/sending process or a call process, for example, after receiving downlink data from a base station, send the downlink information to the processor 610 for processing, and in addition, send uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal provides a user with wireless broadband internet access through the network module 602, for example, helping the user to send or receive an e-mail, to browse a web page, or to access streaming media.

The audio output unit 603 may convert audio data received by the radio frequency unit 601 or the network module 602 or stored in the memory 609 into an audio signal and output the audio signal as a sound. In addition, the audio output unit 603 may further provide audio output (for example, a call signal received tone or a message received tone) that is related to a specific function performed by the terminal 600. The audio output unit 603 includes a speaker, a buzzer, a telephone receiver, and the like.

The input unit 604 is configured to receive an audio or video signal. The input unit 604 may include a graphics processing unit (GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or sent by the radio frequency unit 601 or the network module 602. The microphone 6042 can receive a sound and can process the sound into audio data. The processed audio data can be converted into a format that can be sent to a mobile communication base station through the radio frequency unit 601 in a telephone call mode, for outputting.

The terminal 600 further includes at least one sensor 605, for example, an optical sensor, a motion sensor, and another sensor. For example, the optical sensor includes an ambient light sensor and a proximity sensor. The ambient light sensor may adjust brightness of a display panel 6061 based on intensity of ambient light. When the terminal 600 moves near an ear, the proximity sensor may disable the display panel 6061 and/or backlight. As a motion sensor, an accelerometer sensor may detect for a magnitude of acceleration in various directions (usually three axes), may detect a magnitude and a direction of gravity when the terminal is static, and may be configured to recognize a posture of the terminal (for example, landscape/portrait mode switching, a related game, or magnetometer posture calibration), provide a function related to vibration recognition (for example, a pedometer or a keystroke), or the like. The sensor 605 may further include a fingerprint sensor, a pressure sensor, an iris sensor, a molecular sensor, a gyroscope, a barometer, a hygrometer, a thermometer, or an infrared sensor. Details are not described herein.

The display unit 606 is configured to display information input by the user or information provided for the user. The display unit 606 may include a display panel 6061, and the display panel 6061 may be configured in the form of a liquid crystal display (LCD), an organic light-emitting diode (OLED), or the like.

The user input unit 607 may be configured to receive input digit or character information, and generate a key signal input related to a user setting and function control of the terminal. For example, the user input unit 607 includes a touch panel 6071 and other input devices 6072. The touch panel 6071, also referred to as a touchscreen, may capture a touch operation performed by a user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 6071 may be implemented in a plurality of forms, for example, as a resistive, capacitive, infrared, or surface acoustic wave touch panel. The user input unit 607 may further include other input devices 6072 in addition to the touch panel 6071. For example, the other input devices 6072 may include but are not limited to a physical keyboard, a function key (such as a volume control key or a power on/off key), a trackball, a mouse, a joystick, and the like. Details are not described herein.

The touch panel 6071 may cover the display panel 6061. After detecting a touch operation on or near the touch panel 6071, the touch panel 6071 transmits information about the touch operation to the processor 610 for the processor 610 to determine a touch event type, and then the processor 610 provides a corresponding visual output on the display panel 6061 based on the touch event type. In FIG. 6, the touch panel 6071 and the display panel 6061 serve as two independent components to implement input and output functions of the terminal. However, in some embodiments, the touch panel 6071 and the display panel 6061 may be integrated to implement the input and output functions of the terminal. This is not specifically limited herein.

The interface unit 608 is an interface for connecting an external apparatus to the terminal 600. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 608 may be configured to receive input (for example, data information and electric power) from the external apparatus, and transmit the received input to one or more elements in the terminal 600; or may be configured to transmit data between the terminal 600 and the external apparatus.

The memory 609 may be configured to store a software program and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, or may include a non-volatile memory, for example, at least one magnetic disk storage device, a flash memory device, or other volatile solid-state storage devices.

The processor 610 is a control center of the terminal, connects various parts of the entire terminal by using various interfaces and lines, and executes various functions and data processing of the terminal by running or executing a software program and/or a module stored in the memory 609 and invoking data stored in the memory 609, so as to perform overall monitoring on the terminal. The processor 610 may include one or more processing units. Optionally, an application processor and a modem processor may be integrated into the processor 610. The application processor mainly processes an operating system, a user interface, an application program, and the like. The modem processor mainly processes wireless communication. It may be understood that the modem processor may alternatively not be integrated into the processor 610.

The terminal 600 may further include a power supply 611 (for example, a battery) that supplies power to the components. Optionally, the power supply 611 may be logically connected to the processor 610 by using a power management system, so as to implement functions such as charging management, discharging management, and power consumption management by using the power management system.

In addition, the terminal 600 includes some functional modules that are not shown. Details are not described herein.

Optionally, an embodiment of this disclosure further provides a terminal, including a processor 610, a memory 609, and a computer program stored in the memory 609 and executable on the processor 610. When the computer program is executed by the processor 610, the processes of the foregoing embodiments of the uplink transmission processing method are implemented, with the same technical effects achieved. To avoid repetition, details are not described again herein.

Figure 7:
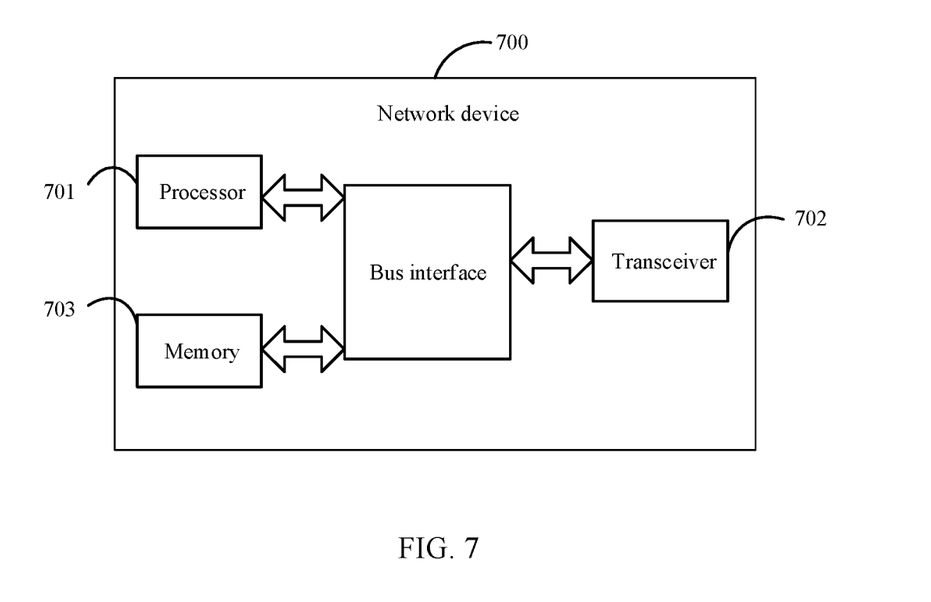
FIG. 7 is a structural diagram of another network device according to an embodiment of this disclosure.

Referring to FIG. 7, FIG. 7 is a structural diagram of another network device according to an embodiment of this disclosure. As shown in FIG. 7, the network device 700 includes a processor 701, a transceiver 702, a memory 703, and a bus interface.

The transceiver 702 is configured to transmit configuration information, where the configuration information is used to indicate uplink transmission stop information in a first absolute time period, or the configuration information is configuration information for stopping uplink transmission on a first resource.

Optionally, the configuration information is used to indicate a quantity of stoppable uplink transmissions in the first absolute time period; or
    the configuration information is used to indicate a proportion of stoppable uplink transmissions in the first absolute time period; or
    the configuration information is used to indicate a duration of stoppable uplink transmissions in the first absolute time period.

Optionally, the quantity of stoppable uplink transmissions is a maximum quantity of stoppable uplink transmissions in the first absolute time period; or
    the proportion of stoppable uplink transmissions is a maximum proportion of stoppable uplink transmissions in the first absolute time period; or
    the duration of stoppable uplink transmissions is a maximum duration of stoppable uplink transmissions in the first absolute time period.

Optionally, the proportion is:
    a proportion of the quantity of stoppable uplink transmissions in a total quantity of uplink transmissions; or
    a proportion of the quantity of stoppable uplink transmissions in a total quantity of uplink and downlink transmissions.

Optionally, the configuration information for stopping uplink transmission is used to indicate uplink transmission stop information in N time domain resources, where N is an integer greater than 1; and the first resource is a resource, in the time domain resources, whose time granularity information is a first time granularity, or the first resource is a first bandwidth part BWP or a first cell.

Optionally, the first time granularity is configured through at least one of:

a subcarrier spacing, a cell identifier, a cell group identifier, a BWP identifier, or an absolute time granularity.

The foregoing network device can reduce the interference to the terminal.

The transceiver 702 is configured to receive and send data under control of the processor 701. The transceiver 702 includes at least two antenna ports.

In FIG. 7, a bus architecture may include any quantity of interconnected buses and bridges, and connect together various circuits of one or more processors represented by the processor 701 and a memory represented by the memory 703. The bus architecture may further interconnect various other circuits such as a peripheral device, a voltage regulator, and a power management circuit. These are all well known in the art, and therefore are not further described in this specification. The bus interface provides an interface. The transceiver 702 may be a plurality of elements, including a transmitter and a receiver, and provides units configured to perform communication with various other apparatuses over a transmission medium. For different user equipment, the user interface 704 may also be an interface for externally or internally connecting a required device, and the connected device includes but is not limited to a mini keyboard, a display, a speaker, a microphone, a joystick, or the like.

The processor 701 is responsible for management of the bus architecture and general processing, and the memory 703 may store data used by the processor 701 when the processor 701 performs an operation.

Optionally, an embodiment of this disclosure further provides a network device, including a processor 701, a memory 703, and a computer program stored in the memory 703 and executable on the processor 701. When the computer program is executed by the processor 701, processes of the foregoing information configuration method embodiment can be implemented, with a same technical effect achieved. To avoid repetition, details are not described herein again.

An embodiment of this disclosure further provides a non-transitory computer-readable storage medium. The non-transitory computer-readable storage medium stores a computer program, and when the computer program is executed by a processor, the uplink transmission processing method provided in the embodiments of this disclosure are implemented, or when the computer program is executed by a processor, the information configuration method provided in the embodiments of this disclosure are implemented, with a same technical effect achieved. To avoid repetition, details are not described herein again. For example, the non-transitory computer-readable storage medium is a read-only memory (ROM), a random access memory (RAM), a magnetic disk, or an optical disk.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is one of implementations. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, persons of ordinary skill in the art can still derive many variations without departing from the essence of this disclosure and the protection scope of the claims. All these variations shall fall within the protection of this disclosure.

What is claimed is:

1. An uplink transmission processing method, applied to a terminal and comprising:

obtaining configuration information, wherein the configuration information is configuration information for stopping uplink transmission on a first resource; and stopping uplink transmission based on the obtained configuration information;

wherein the configuration information for stopping uplink transmission is used to indicate a maximum quantity of time domain resources stopping uplink transmission in N time domain resources, wherein N is an integer greater than 1, and a time domain resource is a slot or a symbol.

2. The method according to claim 1, wherein the first resource is a resource of a specific cell, a specific bandwidth part (BWP), or a specific cell group.

3. The method according to claim 1, wherein the stopping uplink transmission based on the obtained configuration information comprises:

if resource switching occurs in the terminal, resetting an uplink transmission stop count collected by the terminal, and stopping uplink transmission based on the obtained configuration information; or if resource switching occurs in the terminal, on the basis of an uplink transmission stop count collected by the terminal, stopping uplink transmission based on the obtained configuration information.

4. The method according to claim 3, wherein the resource switching is bandwidth part (BWP) switching, cell group switching, or cell switching.

5. The method according to claim 3, wherein the obtained configuration information comprises first configuration information of a resource used by the terminal before the resource switching and second configuration information of a resource used by the terminal after the resource switching, and the stopping uplink transmission based on the obtained configuration information comprises:
  stopping uplink transmission based on the second configuration information.

6. The method according to claim 1, wherein the configuration information for stopping uplink transmission is used to indicate that uplink transmission for a maximum of 20 slots is stopped during uplink transmission in 200 slots.

7. A non-transitory computer-readable storage medium, wherein the non-transitory computer-readable storage medium stores a computer program, and when the computer program is executed by a processor, the steps of the uplink transmission processing method according to claim 1 are implemented.

8. An information configuration method, applied to a network device and comprising:
  transmitting configuration information, wherein the configuration information is configuration information for stopping uplink transmission on a first resource;
  wherein the configuration information for stopping uplink transmission is used to indicate a maximum quantity of time domain resources stopping uplink transmission in N time domain resources, wherein N is an integer greater than 1, and a time domain resource is a slot or a symbol.

9. The method according to claim 8, wherein
the first resource is a resource of a specific cell, a specific bandwidth part (BWP), or a specific cell group.

10. The method according to claim 8, wherein the configuration information for stopping uplink transmission is used to indicate that uplink transmission for a maximum of 20 slots is stopped during uplink transmission in 200 slots.

11. A network device, comprising a memory, a processor, and a program stored in the memory and executable on the processor, wherein when the program is executed by the processor, the steps of the information configuration method according to claim 8 are implemented.

12. The network device according to claim 11, wherein the first resource is a resource of a specific cell, a specific bandwidth part (BWP), or a specific cell group.

13. The network device according to claim 11, wherein the configuration information for stopping uplink transmission is used to indicate that uplink transmission for a maximum of 20 slots is stopped during uplink transmission in 200 slots.

14. A non-transitory computer-readable storage medium, wherein the non-transitory computer-readable storage medium stores a computer program, and when the computer program is executed by a processor, the steps of the uplink transmission processing method according to claim 8 are implemented.

15. A terminal, comprising a memory, a processor, and a program stored in the memory and executable on the processor, wherein the program, when executed by the processor, causes the terminal to perform:
  obtaining configuration information, wherein the configuration information is configuration information for stopping uplink transmission on a first resource; and
  stopping uplink transmission based on the obtained configuration information;
  wherein the configuration information for stopping uplink transmission is used to indicate a maximum quantity of time domain resources stopping uplink transmission in N time domain resources, wherein N is an integer greater than 1, and a time domain resource is a slot or a symbol.

16. The terminal according to claim 15, wherein
the first resource is a resource of a specific cell, a specific bandwidth part (BWP), or a specific cell group.

17. The terminal according to claim 15, wherein the program, when executed by the processor, causes the terminal to perform:
  if resource switching occurs in the terminal, resetting an uplink transmission stop count collected by the terminal, and stopping uplink transmission based on the obtained configuration information; or
  if resource switching occurs in the terminal, on the basis of an uplink transmission stop count collected by the terminal, stopping uplink transmission based on the obtained configuration information.

18. The terminal according to claim 17, wherein the resource switching is bandwidth part (BWP) switching, cell group switching, or cell switching.

19. The terminal according to claim 17, wherein the obtained configuration information comprises first configuration information of a resource used by the terminal before the resource switching and second configuration information of a resource used by the terminal after the resource switching, and the program, when executed by the processor, causes the terminal to perform:
  stopping uplink transmission based on the second configuration information.

20. The terminal according to claim 15, wherein the configuration information for stopping uplink transmission is used to indicate that uplink transmission for a maximum of 20 slots is stopped during uplink transmission in 200 slots.

* * * * *